United States Patent [19]
Leonard

[11] 4,320,690
[45] Mar. 23, 1982

[54] MUSICAL STRUCTURAL INTEGRATOR

[76] Inventor: Verna M. Leonard, 9360 N. Blackstone, Fresno, Calif. 93710

[21] Appl. No.: 123,194

[22] Filed: Feb. 21, 1980

[51] Int. Cl.$^3$ ............................................. G09B 15/02
[52] U.S. Cl. ..................................................... 84/480
[58] Field of Search .................. 84/471 SR, 473, 474, 84/480, 485 SR

[56] References Cited
U.S. PATENT DOCUMENTS

| | | | |
|---|---|---|---|
| 741,017 | 10/1903 | Curtiss | 84/480 |
| 3,842,708 | 10/1974 | Leonard | 84/485 SR |
| 3,884,112 | 5/1975 | Leonard | 84/471 SR |

*Primary Examiner*—Lawrence R. Franklin
*Attorney, Agent, or Firm*—Ralph S. Branscomb

[57] ABSTRACT

The present invention integrates the entire body of musical knowledge relating to key signatures, basic chord structure, the logical progression of chords within a key signature according to the cycle of fourths, identification of the root tone both of scales and of chords, the replication of chord and scale structure over the keys of a piano or the like for each consecutive octave, and the display of the most suitable inversion to use in any particular instance for a particular chord in the selected key signature. All of this information is assembled in an easily usable, flexible form having selectable key signature display panels on the left registering with a central matrix comprised of several rows of scale tones in a particular octave, this matrix being one of seven matrices pertaining to the seven octaves on the piano keyboard, with the 3rd basic element being the plurality of horizontal displays naming the diatonic scale of each pertinent key signature, these displays being selectably registerable with the matrix to correspond with the suitable vertical panel to the left of the matrix.

3 Claims, 3 Drawing Figures

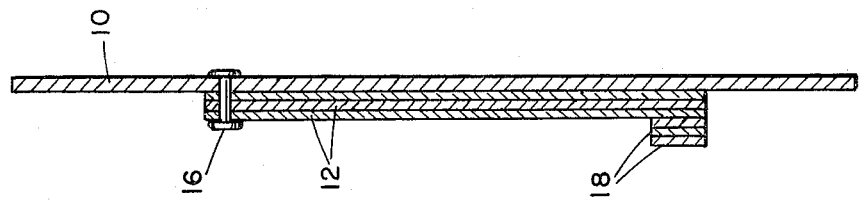
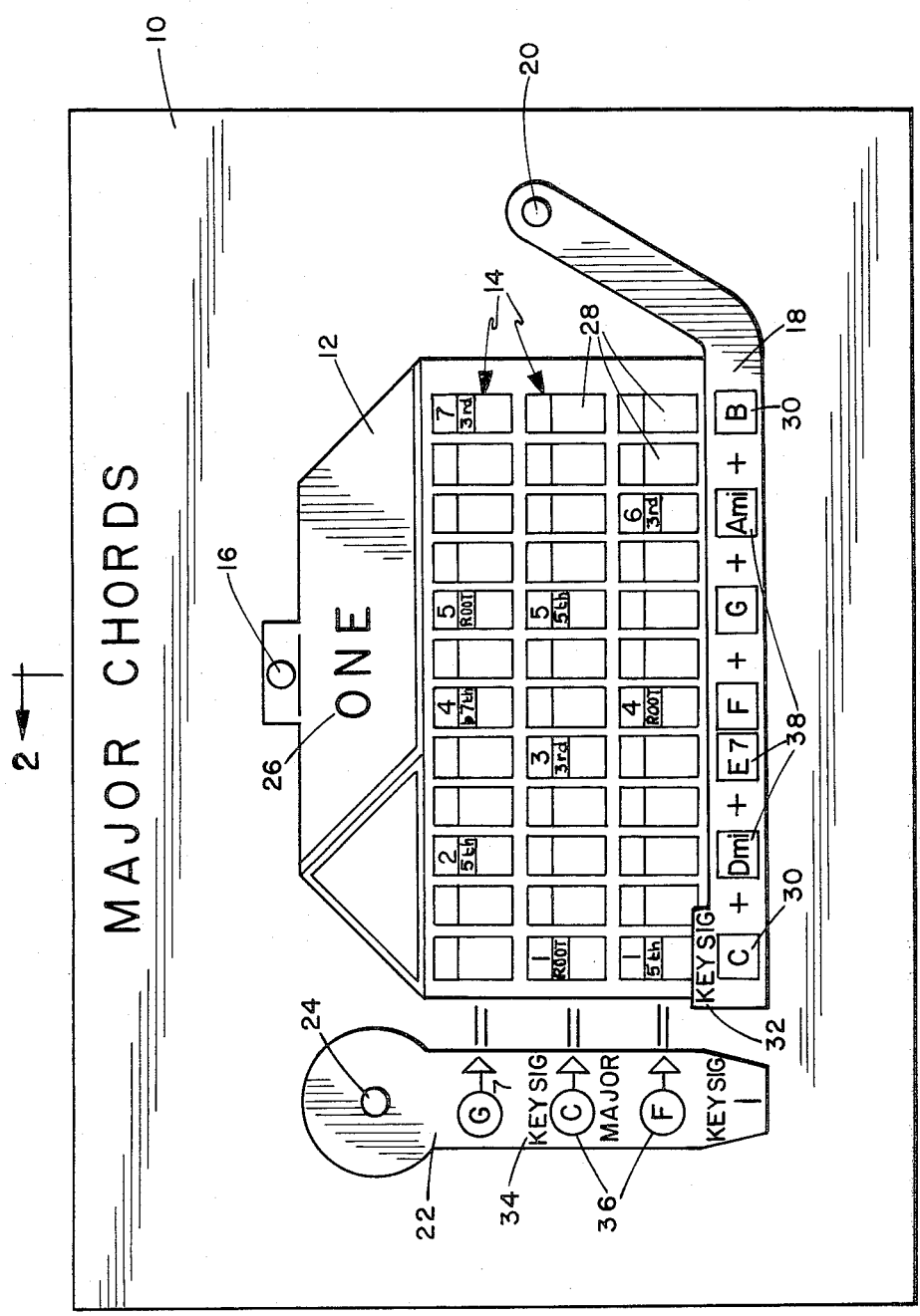

MUSICAL STRUCTURAL INTEGRATOR

BACKGROUND OF THE INVENTION

The structure of music gets very complex very quickly when one is studying it in depth. It is not simply a matter of conceptual difficulty, which is some instances can be overcome fairly quickly, but it is the compounding of the conceptual problems with that of memory, i.e., remembering the relationships of different key signatures to one another and the different chord types to one another, which chord types of course can be fit into any of the key signatures. There is the additional problem of recognizing chords and their different inversions, and on top of all of this is the task of developing the manipulative skill necessary to apply one's knowledge to a keyboard or other musical instrument.

For these reasons it is very helpful to students as well as accomplished pianists to have training aids which are able to graphically display and integrate a number of different musical facts in a fairly simple format, and which by virtue of the physical movement of the component parts define physically analogies to the mental structure representing music.

SUMMARY OF THE INVENTION

The present invention is such a teaching aid and it coordinates a large amount of musical information and music theory subsystems into a single device. As will be described in the detailed description, a number of otherwise problematic areas in music are made quite easy by the use of this device, the device itself basically setting forth an analogy of the piano keyboard, the different diatonic scales superimposed on the keyboard representing the different key signatures, and the basic interrelated chords as they occur in each of the key signatures and how they are played in that key signature on the keyboard analog.

BRIEF DESCRIPTION OF THE DRAWINGS

FIG. 1 is a front elevation view of the device;

FIG. 2 is a section taken along line 2—2 of FIG. 1;

DETAILED DESCRIPTION OF THE PREFERRED EMBODIMENT

Figure 3:
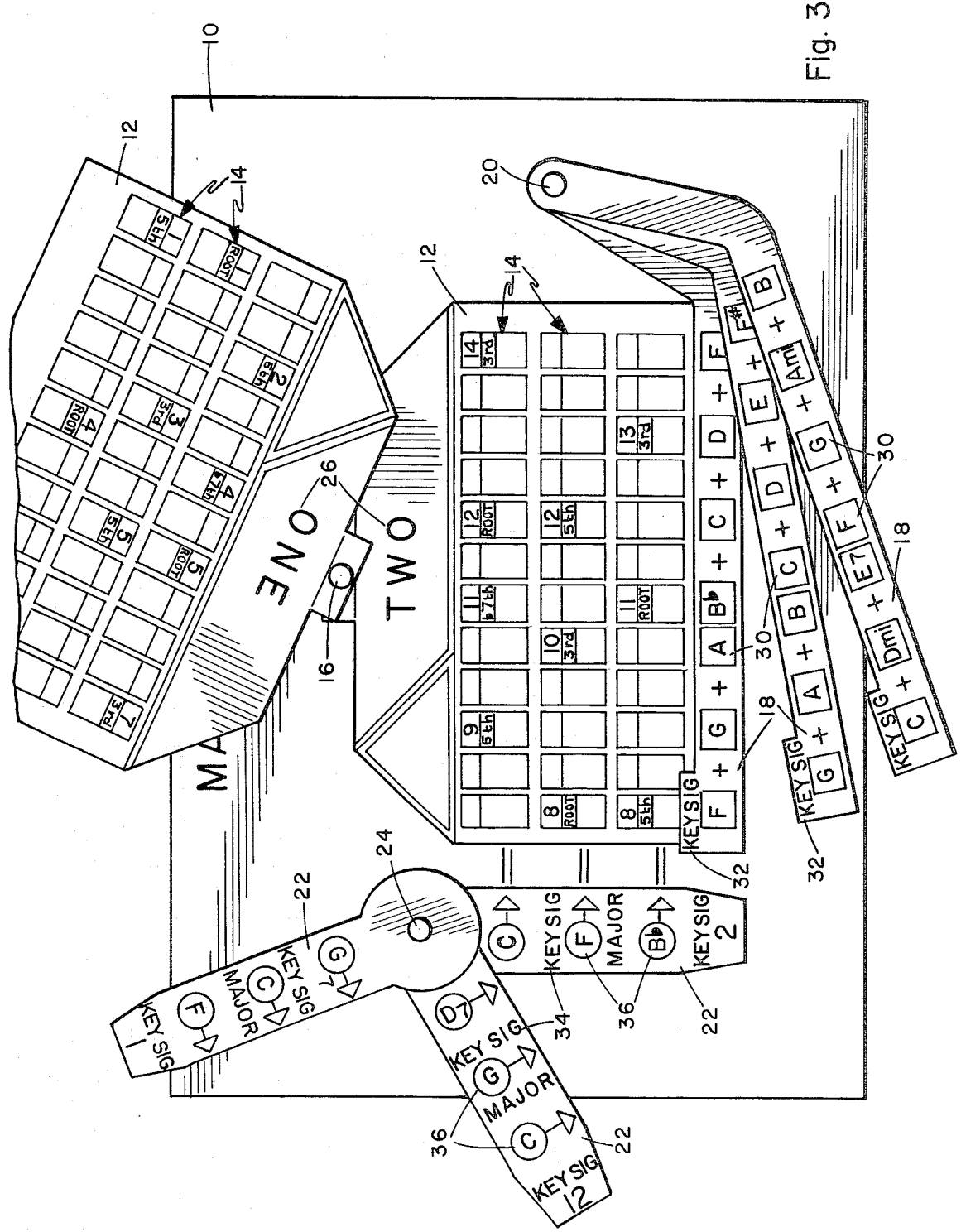
FIG. 3 is a front elevation view showing the vertical and horizontal arrays and the keyboard matrix in their selectably pivoted mode.

The invention has a frame 10 which need be nothing more than a sheet of stiff cardboard or the like and to this frame are pivoted three groups of cards. The first group is indicated at 12, each of these cards displaying a matrix 14 comprised of horizontal rows which will be described in more detail below. Each of the cards represents a single octave and seven cards are in the stack to represent the seven octaves of a piano keyboard. Naturally, more or fewer of these cards could be utilized if so desired. The cards are all pivoted together at common pivot point 16.

The second group of cards are the horizontal array cards at 18 which are embodied in this implementation as swing arms commonly pivoted to a brad at 20.

The third group of cards is the vertical array to the left of the matrix cards 12 and defined in this embodiment by a plurality of panels 22 pivoted at 24. These card groups, in their various modes of deployment, represent the totality of the operation of the device.

Turning now to the details, the matrix cards 12 each represent one octave of the piano keyboard which is indicated at 26. In each octave, the matrix 14 is comprised of a display of spaced indicia 28, in the drawing being imitative of the shape of an old-fashioned window, which are spaced identically with the spacing of each key (the chromatic scale) of the piano keyboard and when placed as the first octave, second octave and so forth on the piano keyboard, each of the windows or indicia 28 registers directly vertically above a particular key of the keyboard, and even absent utilizing the device in this fashion each of the windows stands for a particular scale tone, although it may not be readily apparent glancing at the matrix alone.

The matrix is comprised of three rows in the preferred embodiment but could easily be expanded to six rows to include minor chords as will become apparent hereafter, or even twelve rows representing all the common chords having their roots corresponding to each consecutive scale tone of the chromatic scale.

Turning back to the embodiment at hand, the swing arms 18 are each associated with a particular key signature, the scale tones includes in that key signature being identified at 30, the left most of which is identified as also naming the key signature by indicia 32. The scale tones 30 each register with a row of overlying windows 28, indicating that those positions on the keyboard are in fact the scale tones identified on the swing arm.

Turning lastly to the vertically arrayed panels 22, for each of the horizontal swing arms 18, defining a particular key signature, there is a corresponding vertical panel 22 which relates to the same key signature. In FIG. 1 both of these elements pertain to the key of C as is indicated at 34 on the panel 22, the "key sig" pertaining to the indicia immediately below. The letters indicated at 36 are actually chord names and each of the chords so identified horizontally registers with one of the rows in the matrix 14. The chords 36 are not arbitrary chords, but instead the major chord corresponding to the key signature C Major in FIG. 1 is the central chord on the panel 22, with the other chords being arranged according to the cycle of Fifths going upward, equivalent to the cycle of Fourths going downward.

Again referring to FIG. 1, note that the uppermost chord 36 on the foremost panel 22 is a G Seventh Chord. If one proceeds visually from the chord in indication on panel 22 across to the matrix and follows the row aligned with the $G_7$, one will note that the window 28 above scale tone D on swing arm 18 is market "5th". Continuing, one notes "flat $b_{7th}$", "root", and "third" all appear at selected windows in the top row in the matrix 12. These selected windows vertically align with the named scale tones comprising the $G_{7th}$ Chord, and the further indicia indicates what position in the chord that scale tone represents. In the example at hand, the root is actually G which is more than halfway through the octave. In its uninverted form therefore, the G would be the root scale tone, the B next, then followed by the D and F. Therefore the scale tones as indicated in FIG. 1 for the $G_{7th}$ Chord represent the second inversion. This is quite significant to the invention because when playing the piano it can be seen at a glance that this inversion falls within the first octave and it can be further seen how it relates to the chords just played, or to be subsequently played, so that the most convenient inversion can be identified and played rather than the root positon or a less convenient inversion. It is also apparent in the chord where the root positon lies when an inversion is being played, so that a great deal of information concerning the inversions is thus presented.

As indicated above, the chords named on panel 22 have a fixed relationship which is the same on each panel, i.e., they proceed accordingly to the cycle of 5ths. Because of this, regardless of the key signature each of the panels 22 will match all of the matrix cards 12. To illustrate this point, turning to FIG. 3 it will be noted that the vertical panel which is exposed is the key signature of F. Because the named chords progress upwardly according to the cycle of fifths, the C Chord above the F Chord in that particular panel picks out exactly the same scale tones from the matrix card 12 in the second octave as the $G_7$ Chord (FIG. 1) did in the first octave. Notice all of the octave cards are identical insofar as the position of the chord scale tones is concerned. Thus, although the C Chord in FIG. 3 also picks out the "5th", "7th", "root", and "third", in exactly the same order as did the $G_7$ Chord in FIG. 1, because the exposed panel 22 in FIG. 3 corresponds with the key signature of F swing arm 18, the same finger position in the F key signature produces a C Chord and in the C key signature produces a $G_{7th}$. If the chords on the panels 22 did not maintain the identical order according to the cycle of fifths this relationship would not exist and the same matrix card 12 could not be used repeatedly with the different combinations of horizontal and vertical arrays.

It thus becomes clear from the use of the teaching aid that certain chord types, such as the major, tonic, and subdominant, remain the same relatively to one another regardless of the key signature in question, and it also becomes apparent that octaves can be flipped out of the way and selectively used without affecting at all the relation of the diatonic scale and the chords within that scale relative to the octave structure.

In another implementation which has not been shown in the drawings the cycle of fifths could continue upwardly on the panel 22 to include the minor chords. Taking the key of C for example in FIG. 1, the chords moving upwardly would be D Minor, A Minor, and $E_{7th}$. A subsequent stack of three more rows would be required in the matrix 14. It should be noted that the scale tones 30 are also marked as chord symbols at 38, i.e., the minor and 7th abbreviations are placed next to the scale tone name, and this enables the teaching device to be used in reverse in the following manner. If one is in the key of C as shown in FIG. 1 and wants to find the F Chord, you would traverse up the matrix directly above F until you came across the window 28 that said "root", and the chord indicated at 36 corresponding to that row would be represented in that row. If one wanted to make a D Minor chord in the key of C, assuming the matrix 14 had been extended into a six-tier matrix, one would need go up to the fourth row where the window 28 would say "root", and the corresponding chord name 36 would appear alongside that row on the panel 22.

It can thus be seen that contrary to the use of some musical teaching aid devices which are either quite complicated or so esoteric as to be of little practical use, this invention really does accomplish a great number of different ends in an extremely simple and elegant fashion.

There are of course variations within the scope of the appended claims which would fall within the claim of the invention, including the provision of the chord arrays 22 and horizontal diatonic scale key signature arrays 30 on single sheets, or separate but positionable other than by being co-pivoted, the main purpose of the invention being to juxtapose a single key signature from a selection of key signatures against a matrix which integrates the key signature with several chords in a particular arrangement registering along the side of the matrix.

Referring back to FIG. 1 it will be noted that the three major chords of a key signature which are most important, referred to as the tonic, dominant, and subdominant, are all based on one of the scale tones in the key signature, i.e., the root of the chord represents one of the scale tones of the diatonic scale. Specifically, in FIG. 1 note that the major chords shown on the display 22 take their roots from the F, C, and G scale tones, respectively. As stated above, this sequence follows the cycle of fifths and continuing that cycle one arrives for the next chord at the D scale tone, which is indicated by the chord name indicators 38 as being the root tone for a D Minor Chord. If the minor chords were put above the major chords on the cards 22, in the C key signature they would appear as D Minor as mentioned, then A Minor, then $E_7$. Thus one could utilize a matrix and vertical display combination having six tiers, and it would even be possible to go to twelve tiers to show the more irregular chords which are based on root scale tones between the scale tones of the key signature scale.

Along this same vein it should be noted that whereas this discussion has centered on formulating a chord from the chord symbols 36 the process can be done in reverse. Suppose one wishes to find how to formulate the chord which uses G as the root tone in the key signature of C. One takes the G from the scale tone row 30, and follows it vertically upwardly until one finds the window 28 marked "root". The root indicates that the scale tone below is the first in the chord, so the indication "root" identifies that horizontal row in the matrix 14 as the one delineating the chord rooted in the selected scale tone. Travelling thence to the left, one can see from the display 22 that in fact that is the $G_7$ chord. The same of course is true extrapolated into six or more vertically stacked horizontal rows of the indicators 28.

It can thus be seen that the instant device is quite versatile and informative and actually integrates a fairly impressive amount of musical knowledge in a single, simple and graphically displayed device which is very easily understood and requires little or no interpretation before being applied directly to the keyboard in the form of fingering. Anyone versed in playing a keyboard instruction will recognize the simplicity of this device coupled with its completeness when it comes to displaying the principal chords and how they are formed in a key signature in any octave across the keyboard, thereby setting forth in a single device much of the theory of the western music system.

What is claimed is:
1. A universal music structure integrator comprising:
 (a) a frame;
 (b) a plurality of overlying scale tone matrices pivoted to said frame to be selectively displayed on said frame each of said matrices comprising a plurality of horizontal rows of spaced indicia vertically registerable with respective individual keys of a piano keyboard and each row displays twelve chromatic scale positions and each matrix represents a single octave and the matrices are numbered to represent consecutive octaves of the keyboard;

(c) a plurality of horizontal arrays selectably positionable beneath the selected scale tone matrix, said horizontal arrays each displaying a diatonic scale in a particular key signature the individual scale tones of which register vertically with the spaced indicia in said rows;

(d) a plurality of vertical arrays on separate panels co-pivoted to said frame and selectable positionable at one side of said selected matrix, each of said vertical arrays displaying a plurality of named chords related to a key signature corresponding to the scale on a respective one of said horizontal arrays, such that there is a one-to-one relationship between vertical and horizontal arrays, respectively the former displaying chords from the key signature of the scale of the latter, with each of the named chords of said vertical arrays registering with one of the horizontal rows of said matrix; and (e) the indicia on each row of each of said matrices indicating which scale tones selected from the scale on the selected underlying horizontal array comprise the chord named in the vertical array registered with the respective row whereby each of said matrices can select any of the key signatures represented by said horizontal arrays and indicate the proper scale tones to be played, in the chords indicated on the respective vertical array.

2. Structure according to claim 1 wherein said horizontal arrays each comprise a swing arm having a diatonic scale thereon, said swing arm being co-pivoted to said frame to permit swinging said arm selectively into registry with the bottom of said selected matrix or out of the way.

3. Structure according to claim 2 wherein the chords named on each of said vertical arrays are arranged according to a standard pattern according to the cycle of fourths to permit the same row of said matrix to identify the scale tones of a plurality of chords identically positioned on the respective vertical arrays and the scale tones of the named chord of each row of said matrix is numbered consecutively from octave to octave over the totality of said matrix displays.

* * * * *